Patented June 25, 1935

2,006,003

UNITED STATES PATENT OFFICE 2,006,003

COMPLEX COMPOUNDS OF ORGANIC MERCAPTO COMPOUNDS

Walter Schoeller, Berlin-Westend, Hans Georg Allardt, Berlin-Reinickendorf-West, and Adolf Feldt, Berlin-Charlottenburg, Germany, assignors to Schering-Kahlbaum A. G., Berlin, Germany No Drawing. Application July 30, 1932, Serial No. 627,098. In Germany August 3, 1931

6 Claims. (Cl. 260—11)

Our invention relates to chemical compounds and more especially to complex combinations of organic mercapto compounds.

We have found that the salts of thio-substituted organic compounds with heavy metals and other elements, the sulfide of which is neither soluble in nor decomposed by water, will combine with sulfhydryl compounds and/or their alkali and alkaline earth metal salts either organic or inorganic to form complex acids and/or the alkali or alkaline earth metal salts of such acids, which in view of their stability, their ready solubility in water and their favourable therapeutical properties form valuable remedies.

Of the salts of thio-substitued organic compounds with heavy metals or other elements the sulfide of which is neither soluble in nor decomposed by water, we may for instance use the combination of thio-substituted carbohydrates, such as thioglucose, thiogalactose, thiocellobiose and other organic mercapto compounds, such as for instance the 4-amino-2-mercapto benzene-1-sulfonic acid, the ethyl mercaptan etc. with gold, silver, bismuth, copper, nickel, cobalt, lead, antimony, arsenic etc.

Of the organic or inorganic sulfhydryl compounds, which will combine with these salts to form double compounds, we may cite thio-substituted carbohydrates, such as for instance thioglucose, thiogalactose, thiocellobiose, further organic aliphatic, aromatic or heterocyclic mercapto compounds, such as cysteine, 4-amino-2-mercapto benzene-1-sulfonic acid, xanthogenic acid and the alkali and alkaline earth metal salts of these acids, further inorganic compounds containing sulfhydryl groups or salts derived therefrom, such as sodium hyposulphite or sodium hydrosulphide.

The double compounds thus obtainable are colorless or only slightly colored compounds, which readily dissolve in water, while being insoluble in organic solvents, which are stable and highly efficient in therapeutical respect, have an acid reaction and, by acting thereon with an equivalent quantity of an alkali or alkaline earth compound, can be converted into the neutral or slightly alkaline salts, which may, however, also be obtained directly, if instead of the free sulfhydryl compounds their alkali or alkaline earth metal salts are used.

In practising our invention we may for instance proceed as follows:

Example 1

To 3.9 parts by weight aurothioglucose (AuSC$_6$H$_{11}$O$_5$) is added a solution of 2.54 parts sodium thioglucose (NaSC$_6$H$_{11}$O$_5$) in 6 parts water. A colorless solution is formed at once to which are added 18 parts absolute alcohol, whereupon the clear solution is filtered and to the filtered solution are added further 18 parts alcohol. On standing in the cold a colorless oil separates out, which is separated from the rest by decantation. On addition of some alcohol the oil solidifies. For purification purposes the oil is dissolved in methyl alcohol of 90% and re-precipitated by adding some ether. After prolonged standing in the cold the product crystalizes, forming a colorless powder which is readily soluble in water and dilute alcohol, but insoluble in ether, petrol ether and chloroform.

Example 2

To 3.03 parts silver thioglucose is added a solution of 2.54 parts sodium thioglucose in 4 parts water. In the clear solution the double compound silver thioglucose-sodium thioglucose can be precipitated with alcohol and ether. The product is purified as described with reference to Example 1. It forms a white powder which very readily dissolves in water, only with difficulty in alcohol and is insoluble in ether and in dissociating media.

Analogous complex compounds are obtained with other heavy metal compounds of thio-substituted carbohydrates.

Example 3

70.7 parts antimony thioglucose are dissolved in 100 parts water and into the solution are entered 50.8 parts sodium thioglucose. As soon as the compounds have dissolved completely, the solution is concentrated in vacuo to about one half of its original volume and 200 parts alcohol are added slowly drop by drop under stirring, whereby the complex compound is caused to separate out under the form of a white powder which is then filtered by suction and re-precipitated from its watery solution by aid of alcohol. The compound has the formula

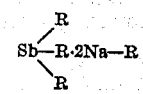

wherein R is the thioglucose radicle. It forms a micro-crystalline powder which readily dissolves in water but is insoluble in alcohol, ether and chloroform.

Example 4

To 66 parts arsenic thioglucose, dissolved in 80 parts water, are added 50.8 parts sodium thioglucose. The solution is concentrated to about one third of its original volume and the 6 fold quantity (by volume) of alcohol is added. The white coloured compound, which separates out, is re-precipitated from its watery solution with methyl alcohol. Its constitution is analogous to that of the antimony compound.

Example 5

In a similar manner 44.9 parts nickel thioglucose and 25.4 parts sodium thioglucose will form a complex compound having the formula

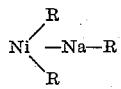

where R is the thioglucose radical. This product is readily soluble in water, but insoluble in alcohol, ether and non-dissociating media.

Example 6

If the aurothioglucose according to Example 1 is replaced by aurothiogalactose, there is obtained the corresponding complex thiogalactose compound, whose properties correspond to those of the thioglucose compound.

Example 7

55.4 parts auro-thiocellobiose ($AuSC_{12}H_{21}O_{10}$) are entered in a solution of 38 parts sodium thiocellobiose ($NaSO_{12}H_{21}O_{10}$) in 100 parts water. The auro-thiocellobiose dissolves in the solution, which is at first alkaline and then becomes neutral. On 700 parts alcohol being slowing added, the complex compound crystallizes out, which is re-crystallized from dilute alcohol. The product has the formula $$AuSC_{12}H_{21}O_{10}.NaSC_{12}H_{21}O_{10}.$$

It forms light yellow crystals which readily dissolve in water and warm dilute alcohol but are insoluble in cold alcohol and ether.

The sodium salts of the thio-substituted carbohydrates may also be replaced by the salts of other alkali or of alkaline earth metals.

Example 8

3.92 parts auro-thioglucose are entered under stirring in a solution of 2.48 parts sodium hyposulphite in 10 parts water. The clear solution is filtered and to the filtrate are added 100 parts absolute alcohol. The complex compound settles down as a yellow oil, which is separated from the rest by decantation and to which is added a great quantity of fresh alcohol which causes the compound to crystallize. For purification purposes the compound is re-precipitated with alcohol from 10 parts water. It has the formula $$AuSC_6H_{11}O_5.Na_2S_2O_3.$$

It is a slightly yellow coloured powder which readily dissolves in water but is insoluble in organic media. It was found by analysis to contain 35.5% Au and 8.0% Na, against 35.8% and 8.3%, respectively, found by calculation.

Example 9

1.57 parts cysteine hydrochloride are dissolved in 15 parts (equal to 3 mols.) 2n-caustic soda solution and into this solution are entered 3.92 parts auro-thioglucose. The solution thus obtained is filtered and to the filtrate are added 75 parts absolute alcohol, whereby the complex compound is precipitated, which is purified by dissolving it in 6 parts water and entering the solution under stirring into 100 parts absolute alcohol. The product thus obtained is a white micro-crystalline powder containing 1 mol. auro-thioglucose coupled with 1 mol. cysteine sodium $+\frac{1}{2}H_2O$. The following schedule shows the percentages found by calculation and by analysis respectively:

|      | C    | H   | S    | Au   | N   | Na  | H₂O |
|------|------|-----|------|------|-----|-----|-----|
| Cal  | 19.1 | 3.0 | 11.3 | 34.9 | 2.5 | 8.1 | 1.6 |
| Anal | 19.1 | 3.3 | 10.9 | 34.6 | 2.7 | 7.7 | 1.4 |

If auro-thioglucose is replaced by the corresponding quantity of silver thioglucose, there is obtained the corresponding complex compound, which forms a white micro-crystalline powder.

Example 10

7.84 parts auro-thioglucose are entered under stirring in a solution of 4.46 parts 4-amino-2-mercapto benzene-1-sulfonic acid $+1H_2O$ in 20 parts 2n-caustic soda solution. On adding to the clear solution the 3 fold quantity (by volume) alcohol the compound first separates out as an oil, which is separated and on addition of further quantities of alcohol solidifies. It is re-precipitated with alcohol from its watery solution. The compound thus purified is a slightly colored powder which dissolves with the greatest ease in water but is insoluble in organic media. It is a combination of 1 mol. auro-thioglucose with 1 mol. of the di-sodium salt of 4-amino-2-mercapto benzene-1-sulfonic acid $$AuSC_{12}H_{21}O_{10}.NaSC_{12}H_{21}O_{10}$$

By acting in a similar manner with 1 mol. auro-thioglucose on 1 mol. sodium thioacetate or 1 mol. potassium xanthogenate there are obtained complex compounds which are distinguished by their ready solubility in water and by their therapeutical efficiency.

Example 11

To 4.23 parts of the sodium salt of 4-amino-2-auro-mercapto benzene-1-sulfonic acid in watery solution is added a solution of 2.54 parts of the sodium compound of thioglucose. By adding to the clear solution the 3 fold volume of alcohol the complex compound is first separated out as an oil, which is converted into solid form, as described above, by separating it from the watery mother liquor and adding alcohol. The weakly yellow colored powder is readily soluble in water but insoluble in organic solvents. Its constitution corresponds to that described in Example 10.

Example 12

42.3 parts of the sodium salt of 4-amino-2-auro-mercapto benzene-1-sulfonic acid are dissolved in 50 parts water. To the solution is added a solution of 24.8 parts sodium hyposulphite in 50 parts water. On adding 500 parts alcohol the complex compound separates out under the form of an oil, which on addition of further quantities of fresh alcohol solidifies in crystalline form. For the purpose of purification it is re-precipitated with alcohol from its watery solution. The compound is an almost colorless powder, readily soluble in water, but insoluble in alcohol, ether, chloroform and benzene.

If instead of the sodium salt 40 parts of the free acid are used, the corresponding complex acid is obtained.

Example 13

30.3 parts silver thio-galactose are entered under stirring in a solution of 24.8 parts sodium hyposulphite in 100 parts water. The silver thiogalactose dissolves in the solution after some time and on concentrating the clear solution in vacuo to a small volume the complex compound crystallizes out, crystallization being rendered complete by the addition of alcohol. The compound is filtered by suction, washed with alcohol and dried. It forms a white micro-crystalline powder which readily dissolves in water, rather readily in methyl alcohol and is insoluble in ether and chloroform. The yield is about 90% of the calculated.

Example 14

126 parts antimony-(3)-thiocellobiose $CH_2O$ are dissolved in water, combined with a solution of 30.1 parts of the di-sodium salt of thiolactic acid and the whole carefully concentrated by evacuation. The syrup thus formed on being triturated with alcohol, solidifies. The solid product is dissolved for purification in some water and re-precipitated by the addition of alcohol. It forms a white powder which readily dissolves in water with alkaline reaction. The yield is about 70% of the calculated.

Example 15

19 parts of the sodium salt of cupro-thiolactic acid and 24.8 parts sodium hyposulphite are dissolved in water and the limpid solution is concentrated as described with reference to the foregoing examples. On adding alcohol the complex compound is obtained which forms a yellow powder readily soluble in water which dissolves in alcohol only with difficulty and is insoluble in ether. The yield is about 60% of the calculated.

Example 16

29.8 parts of the sodium salt of 4-amino-2-argentomercapto benzoic acid and 19.8 parts of the sodium salt of thiosalicylic acid are dissolved together in water and alcohol is added until the solution becomes cloudy. On the solution standing in the cold the complex compound crystallizes out, crystallization being rendered complete by adding further quantities of alcohol. The yield is about 75% of the calculated. The compound is a yellow powder, readily soluble in water, but insoluble in organic media.

Various changes may be made in the details disclosed in the foregoing specification without departing from the invention and sacrificing the advantages thereof.

We claim:—

1. Double compounds having the formula $A.(B)_n$, wherein A is an organic compound containing a sulfhydryl group, the H-atom of which is substituted by an element, the sulfide of which is neither soluble in nor decomposed by water and which element is not combined with elements other than sulfur, while B is a compound containing a sulfhydryl group, the H-atom of which may be substituted by an alkali forming metal, n being an integer, these compounds being readily soluble in water, dissolving only with difficulty in organic solvents and having a high therapeutical value.

2. Double compounds having the formula $A'.(B)_n$, wherein A' is a carbohydrate containing a sulfhydryl group, the H-atom of which is substituted by an element, the sulfide of which is neither soluble in nor decomposed by water, while B is a compound containing a sulfhydryl group, the H-atom of which may be substituted by an alkali forming metal, n being an integer, these compounds being readily soluble in water, dissolving only with difficulty in organic solvents and having a high therapeutical value.

3. Double compounds having the formula $A'.(B')_n$, wherein A' is a carbohydrate containing a sulfhydryl group, the H-atom of which is substituted by an element, the sulfide of which is neither soluble in nor decomposed by water, while B' is a carbohydrate containing a sulfhydryl group, the H-atom of which may be substituted by an alkali forming metal, n being an integer, these compounds being readily soluble in water, dissolving only with difficulty in organic solvents and having a high therapeutical value.

4. Auro-thioglucose-sodium-thioglucose having the formula $$AuSC_6H_{11}O_5.NaSC_6H_{11}O_5,$$

a slightly yellow colored powder readily soluble in water, but insoluble in ether, petrol ether and chloroform.

5. Antimony-thioglucose-sodium-thioglucose, having the formula $$Sb(SC_6H_{11}O_5)_3.2NaSC_6H_{11}O_5.$$

a white powder readily dissolving in water, which is insoluble in alcohol, ether and chloroform.

6. Auro-thiocellobiose-sodium-thiocellobiose, having the formula $$AuSC_{12}H_{21}O_{10}.NaSC_{12}H_{21}O_{10},$$

a slightly yellow colored powder readily soluble in water, but insoluble in alcohol and ether.

WALTER SCHOELLER.
HANS GEORG ALLARDT.
ADOLF FELDT.